US012630148B2

(12) United States Patent
Suh et al.

(10) Patent No.: US 12,630,148 B2
(45) Date of Patent: May 19, 2026

(54) TORQUE VECTORING CONTROL METHOD, COMPUTING SYSTEM SUPPORTING THE SAME, AND VEHICLE SUPPORTING THE SAME

(71) Applicants: HYUNDAI MOTOR COMPANY, Seoul (KR); KIA CORPORATION, Seoul (KR); KOREA UNIVERSITY OF TECHNOLOGY AND EDUCATION INDUSTRY-UNIVERSITY COOPERATION FOUNDATION, Cheonan-si (KR)

(72) Inventors: Jee Yoon Suh, Incheon (KR); Seung Han You, Seoul (KR); Wan Ki Cho, Suwon-si (KR); Chang Jun Jeon, Cheonan-si (KR)

(73) Assignees: HYUNDAI MOTOR COMPANY, Seoul (KR); KIA CORPORATION, Seoul (KR); KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 176 days.

(21) Appl. No.: 18/369,043

(22) Filed: Sep. 15, 2023

(65) Prior Publication Data

US 2024/0351577 A1      Oct. 24, 2024

(30) Foreign Application Priority Data

Apr. 18, 2023    (KR) ........................ 10-2023-0050822

(51) Int. Cl.
*B60W 30/045* (2012.01)
*B60W 40/105* (2012.01)
(Continued)

(52) U.S. Cl.
CPC ........ *B60W 30/045* (2013.01); *B60W 40/105* (2013.01); *B60W 40/109* (2013.01);
(Continued)

(58) Field of Classification Search
CPC ............. B60W 30/045; B60W 40/105; B60W 40/109; B60W 40/114; B60W 2520/10;
(Continued)

(56) References Cited

U.S. PATENT DOCUMENTS

| | | | | |
|---|---|---|---|---|
| 10,442,310 B1 * | 10/2019 | Drako | .................. | B60K 17/145 |
| 2005/0125131 A1 * | 6/2005 | Kato | ...................... | B60T 8/172 |
| | | | | 701/70 |

(Continued)

*Primary Examiner* — Sze-Hon Kong
(74) *Attorney, Agent, or Firm* — Lempia Summerfield Katz LLC

(57) ABSTRACT

A vehicle, a computing system therefor, and a method thereof are provided. The computing system: calculates a longitudinal speed of the vehicle and lateral acceleration of the vehicle; calculates a target yaw rate based on the longitudinal speed of the vehicle and the lateral acceleration of the vehicle; calculates a target yaw moment based on the calculated target yaw rate; and applies the target yaw moment to a torque vectoring motor of the vehicle.

13 Claims, 17 Drawing Sheets

(51) Int. Cl.
*B60W 40/109* (2012.01)
*B60W 40/114* (2012.01)

(52) U.S. Cl.
CPC ....... *B60W 40/114* (2013.01); *B60W 2520/10* (2013.01); *B60W 2520/125* (2013.01); *B60W 2520/14* (2013.01); *B60W 2710/083* (2013.01)

(58) Field of Classification Search
CPC ....... B60W 2520/125; B60W 2520/14; B60W 2710/083; B60W 2540/18; B60W 2720/14; B60W 10/08; B60W 40/08; B60W 2040/0881; B60W 2050/0005; B60W 2050/0011

See application file for complete search history.

(56) References Cited

U.S. PATENT DOCUMENTS

| | | | | |
|---|---|---|---|---|
| 2005/0267666 A1* | 12/2005 | Suzumura | ............. | B60T 8/1755 |
| | | | | 701/70 |
| 2015/0329109 A1* | 11/2015 | Okumura | ............ | B60W 30/045 |
| | | | | 701/41 |
| 2018/0111607 A1* | 4/2018 | Fujita | .................... | B60T 8/1755 |
| 2018/0257651 A1* | 9/2018 | Kitagawa | ............ | B60W 30/188 |
| 2019/0023264 A1* | 1/2019 | Mizutani | ............... | B60T 8/1755 |
| 2019/0176812 A1* | 6/2019 | Hirata | ................. | B60W 30/045 |
| 2019/0270444 A1* | 9/2019 | Park | ...................... | B60W 10/18 |
| 2019/0276039 A1* | 9/2019 | Kambe | ............... | B60W 40/114 |
| 2020/0247394 A1* | 8/2020 | Arima | ................. | B60W 10/184 |
| 2021/0039632 A1* | 2/2021 | Kim | ......................... | B60D 1/30 |
| 2023/0026238 A1* | 1/2023 | Arima | ...................... | B60T 8/24 |

* cited by examiner

100

Mz < 0 & Fyr < 0

------- YAW MOMENT CONTOUR

TORQUE VECTORING CONTROL METHOD, COMPUTING SYSTEM SUPPORTING THE SAME, AND VEHICLE SUPPORTING THE SAME

CROSS-REFERENCE TO RELATED APPLICATION

This application claims the benefit of priority to Korean Patent Application No. 10-2023-0050822, filed in the Korean Intellectual Property Office on Apr. 18, 2023, the entire contents of which are incorporated herein by reference.

TECHNICAL FIELD

The present disclosure relates to torque vectoring control, and more particularly, relates to technologies of supporting torque vectoring control in various modes.

BACKGROUND

Improving a force and grip and speed performance on a straight road may be easier than on a corner. However, because many functions, such as rigidity, suspension, engine, and brake as well as a vehicle body design, have a complex effect in a curved section, such as a turnabout or rotation section, rather than a straight section, it may be very complicated to improve related performance. As such, torque vectoring (TV) is applied to improve precision associated with driving in the curved section.

The TV is a system for allowing a vehicle to control the power at a specific wheel. It is designed to increase handling, vehicle body stability, and performance through TV. Particularly, conventional TV is focused on a part for quickly changing a turning characteristic or enlarging a turning limitation. For example, a conventional TV technology proceeds with its technology development by focusing on only an agile turning characteristic (an increase in steering angle to yaw rate gain or quick yaw rate formation) or turning limit enlargement (maximum lateral acceleration at specific curvature or an increase in maximum passing speed).

Thus, driving performance in the curved section is greatly improved, but vehicle ride comfort is degraded.

SUMMARY

The present disclosure has been made to solve the above-mentioned problems occurring in the prior art while advantages achieved by the prior art are maintained intact.

Aspects of the present disclosure provide a torque vectoring control method for providing more stable driving in a curved section, a computing system supporting the same, and a vehicle supporting the same.

Further aspects of the present disclosure provide a torque vectoring control method for providing more stable driving in a process where a vehicle deviates from a curved section, a computing system supporting the same, and a vehicle supporting the same.

Still further aspects of the present disclosure provide a torque vectoring control method for providing a variety of ride comfort in a curved section, a computing system supporting the same, and a vehicle supporting the same.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a vehicle to which torque vectoring control is applied may include processor that performs control associated with operation of the vehicle and a storage storing at least one instruction for operation of the processor. The processor may be configured to: calculate a longitudinal speed of the vehicle and lateral acceleration of the vehicle; calculate a target yaw rate based on the longitudinal speed of the vehicle and the lateral acceleration of the vehicle; calculate a target yaw moment based on the calculated target yaw rate; and apply the target yaw moment to a torque vectoring motor of the vehicle.

In an embodiment, the processor may be configured to apply the calculated target yaw rate to a differentiator-integrator to calculate the target yaw moment.

In an embodiment, the processor may be configured to: identify a magnitude of a lateral force applied to the vehicle and identify whether the magnitude of the lateral force and a direction of the target yaw predetermined condition; perform torque vectoring motor control according to the target yaw moment, when the predetermined condition is met; and skip the torque vectoring motor control according to the target yaw moment, when the predetermined condition is not met.

In an embodiment, the processor may be configured to determine that the predetermined condition is met when lateral forces of rear wheels of the vehicle are positive and the target yaw moment is in a counterclockwise direction in a process where the vehicle makes a left turn.

In an embodiment, the processor may be configured to add an additional amount of rotation in the counterclockwise direction to a left rear wheel of the vehicle and to add an additional amount of rotation in a clockwise direction to a right rear wheel of the vehicle, in the process where the vehicle makes the left turn.

In an embodiment, the processor may be configured to determine that the predetermined condition is met when lateral forces of rear wheels of the vehicle are negative and the target yaw moment is in a clockwise direction in a process where the vehicle makes a right turn.

In an embodiment, the processor may be configured to add an additional amount of rotation in a counterclockwise direction to a left rear wheel of the vehicle and to add an additional amount of rotation in the clockwise direction to a right rear wheel of the vehicle, in the process where the vehicle makes the right turn.

According to another aspect of the present disclosure, a torque vectoring control method may include collecting, by a processor configured to control operation of a vehicle, sensing information necessary to calculate a longitudinal speed of the vehicle and lateral acceleration of the vehicle at least using a sensor device disposed in the vehicle. The method may also include: calculating, by the processor, the longitudinal speed of the vehicle and the lateral acceleration of the vehicle; calculating, by the processor, a target yaw rate based on the longitudinal speed of the vehicle and the lateral acceleration of the vehicle; calculating, by the processor, a target yaw moment based on the calculated target yaw rate; and applying, by the processor, the target yaw moment to a torque vectoring motor of the vehicle.

In an embodiment, calculating the target yaw moment may include applying, by the processor, the calculated target yaw rate to a differentiator-integrator to calculate the target yaw moment.

In an embodiment, applying the target yaw moment to the torque vectoring motor may include: identifying, by the processor, a magnitude of a lateral force applied to the vehicle; identifying, by the processor, whether the magnitude of the lateral force and a direction of the target yaw moment meet a predetermined condition; performing, by the processor, torque vectoring motor control according to the target yaw moment, when the predetermined condition is met; and skipping, by the processor, the torque vectoring motor control according to the target yaw moment, when the predetermined condition is not met.

In an embodiment, identifying whether the predetermined condition is met may include determining, by the processor, that the predetermined condition is met when lateral forces of rear wheels of the vehicle are positive and the target yaw moment is in a counterclockwise direction in a process where the vehicle makes a left turn.

In an embodiment, performing the torque vectoring motor control may include adding, by the processor, an additional amount of rotation in the counterclockwise direction to a left rear wheel of the vehicle and may include adding, by the processor, an additional amount of rotation in a clockwise direction to a right rear wheel of the vehicle, in the process where the vehicle makes the left turn.

In an embodiment, identifying whether the predetermined condition is met may include determining, by the processor, that the predetermined condition is met when lateral forces of rear wheels of the vehicle are negative and the target yaw moment is in a clockwise direction in a process where the vehicle makes a right turn.

In an embodiment, performing the torque vectoring motor control may include adding, by the processor, an additional amount of rotation in a counterclockwise direction to a left rear wheel of the vehicle and may include adding, by the processor, an additional amount of rotation in the clockwise direction to a right rear wheel of the vehicle, in the process where the vehicle makes the right turn.

According to another aspect of the present disclosure, a system for controlling operation of a vehicle may include storage for operation of the system and a processor operatively connected with the storage. The storage may store at least one instruction necessary for operation of the processor. The processor, according to the at least one instruction, may be configured to: collect, by a processor configured to control operation of a vehicle, sensing information necessary to calculate a longitudinal speed of the vehicle and lateral acceleration of the vehicle at least using a sensor device disposed in the vehicle; calculate, by the processor, the longitudinal speed of the vehicle and the lateral acceleration of the vehicle; calculate, by the processor, a target yaw rate based on the longitudinal speed of the vehicle and the lateral acceleration of the vehicle; calculate, by the processor, a target yaw moment based on the calculated target yaw rate; and apply, by the processor, the target yaw moment to a torque vectoring motor of the vehicle.

In an embodiment, the processor, according to the at least one instruction may, be configured to identify the number of passengers of the vehicle and to control not to apply the target yaw moment to the torque vectoring motor of the vehicle, when the number of the passengers of the vehicle is less than a predetermined number.

In an embodiment, the processor, according to the at least one instruction, may be configured to identify a location of a passenger of the vehicle and to control not to apply the target yaw moment to the torque vectoring motor of the vehicle, when there is no passenger of the vehicle in a predetermined location.

In an embodiment, the processor, according to the at least one instruction, may be configured to output a screen interface for selecting an agile rotation control mode and a comfortable driving control mode (or a chauffeur mode) and to control to apply the target yaw moment to the torque vectoring motor of the vehicle, when the comfortable driving control mode is selected through the screen interface.

In an embodiment, the processor, according to the at least one instruction, may be configured to: collect, by the processor, the longitudinal speed of the vehicle and steering angle information of the vehicle, when the agile rotation control mode is selected through the screen interface; calculate a new target yaw moment based on the longitudinal speed of the vehicle and the steering angle information of the vehicle; and control to apply the new target yaw moment to the torque vectoring motor of the vehicle.

In an embodiment, the processor, according to the at least one instruction, may be configured to identify whether a lateral force of the vehicle and the target yaw moment meet a predetermined reference condition and to control not to apply the target yaw moment to the torque vectoring motor of the vehicle, when the predetermined reference condition is not met.

BRIEF DESCRIPTION OF THE DRAWINGS

The above and other objects, features, and advantages of the present disclosure should be more apparent from the following detailed description taken in conjunction with the accompanying drawings.

5

6

Figure 7A:
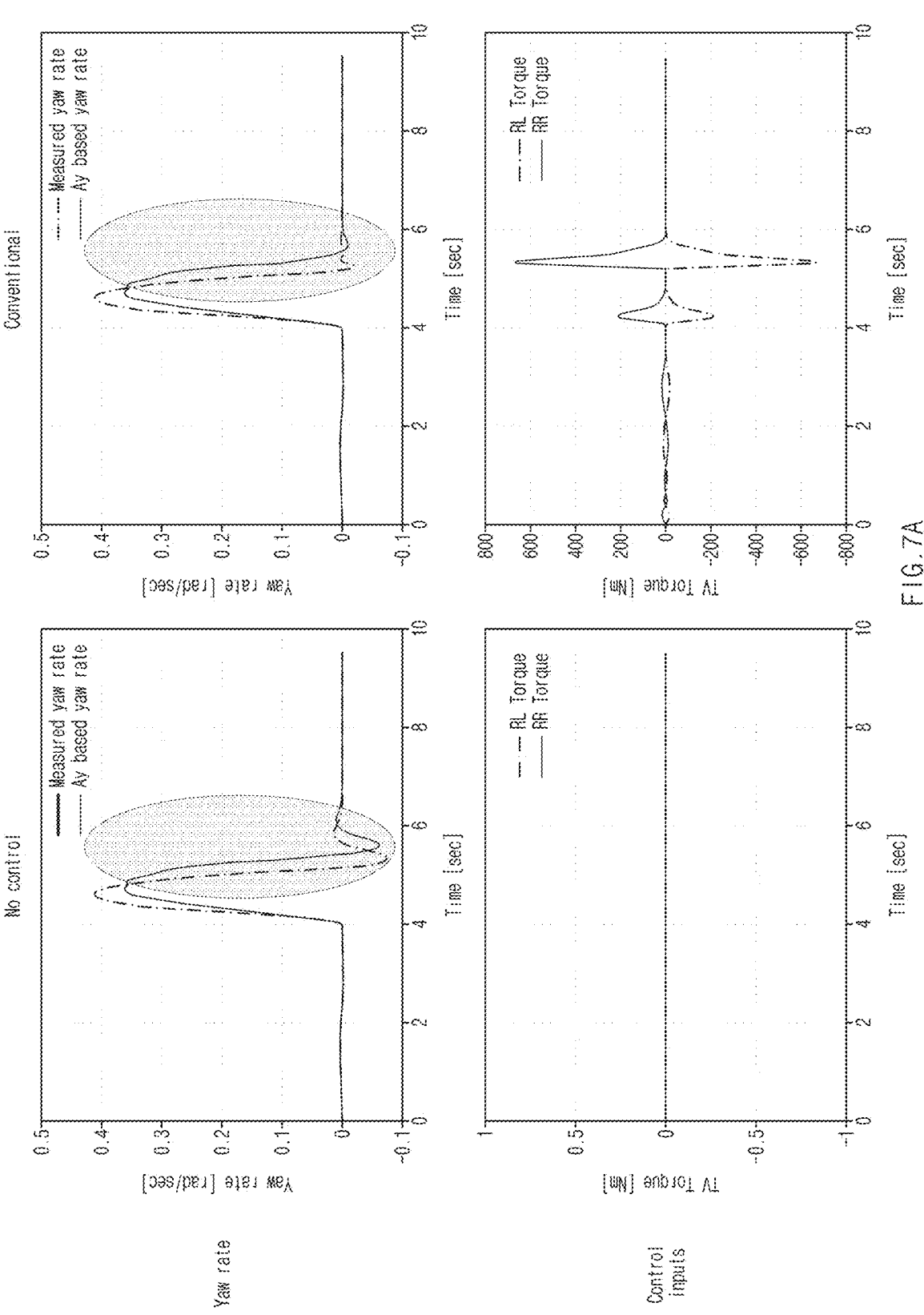
FIG. 7A is a drawing illustrating a general open-loop left-turn simulation result according to a yaw rate and a control input.
Figure 7B:
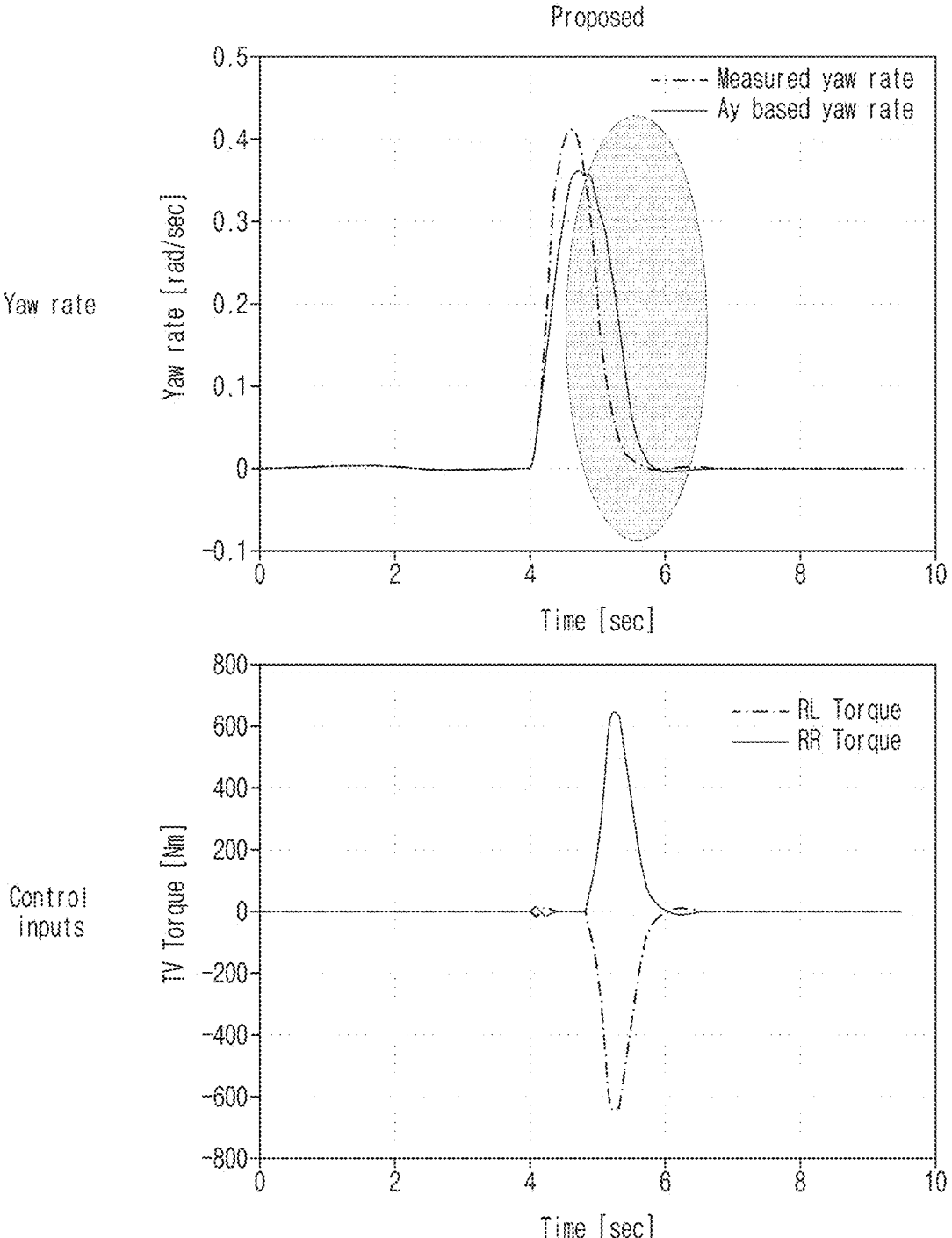
Figure 8A:
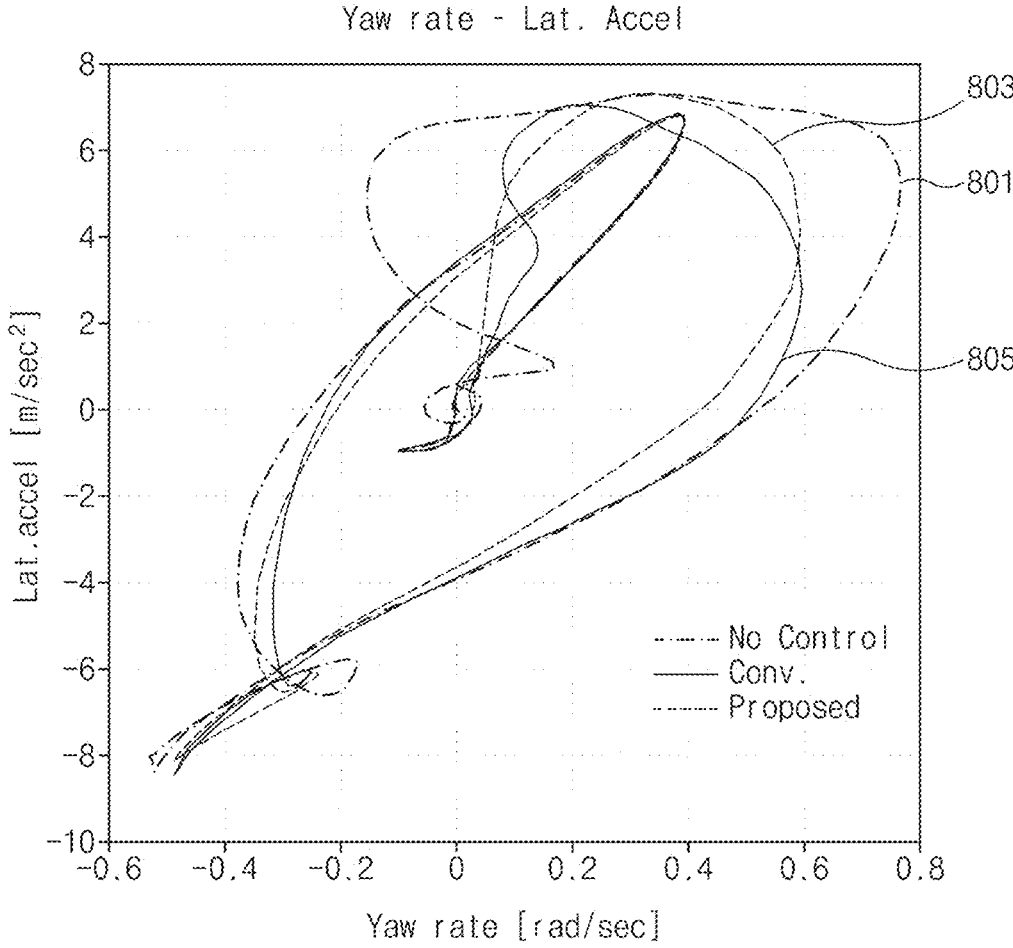
Figure 8B:
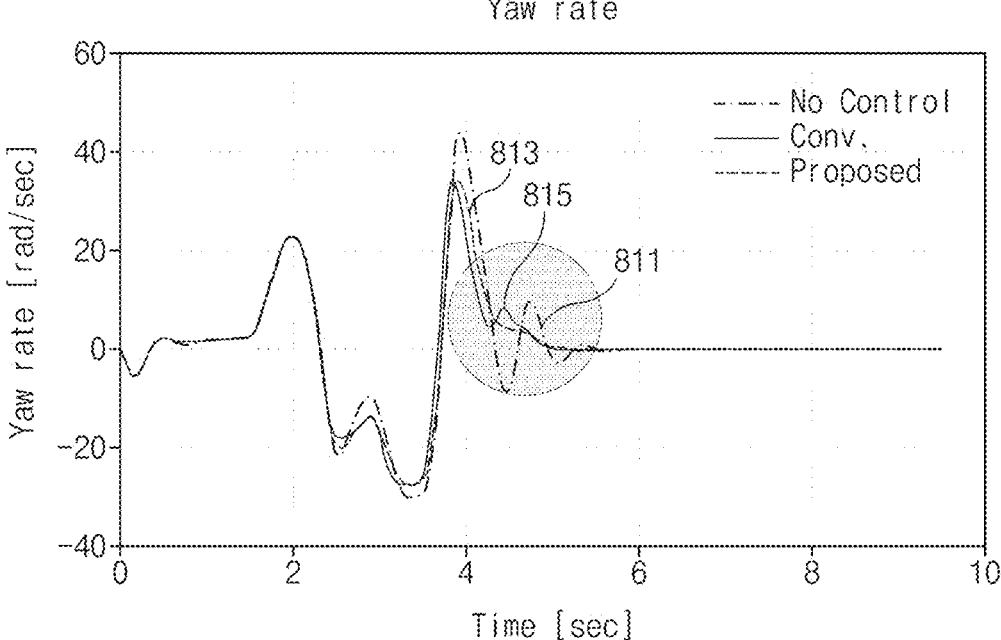
Figure 8C:
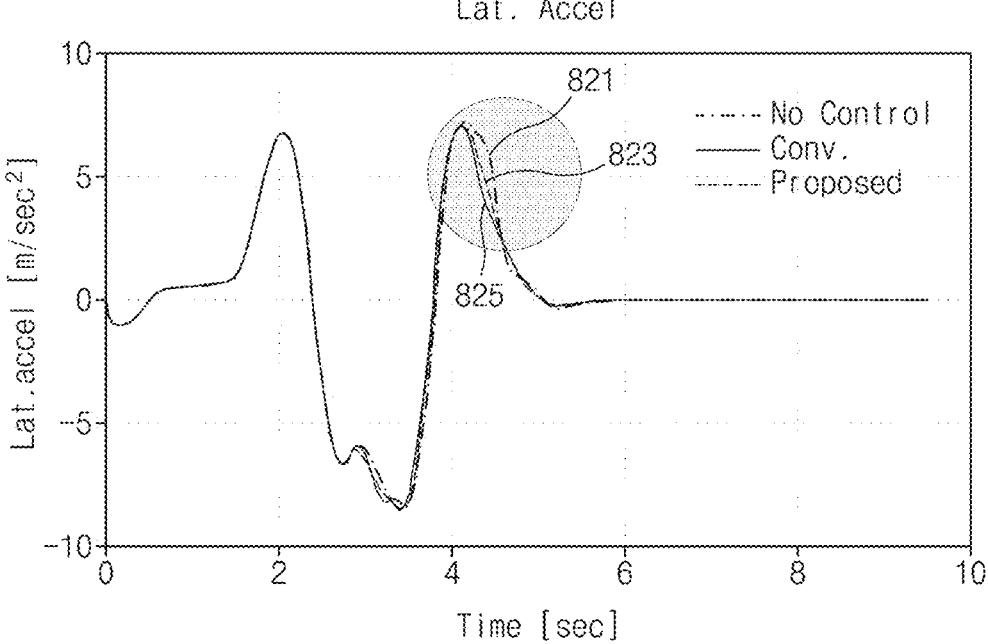
Figure 9A:
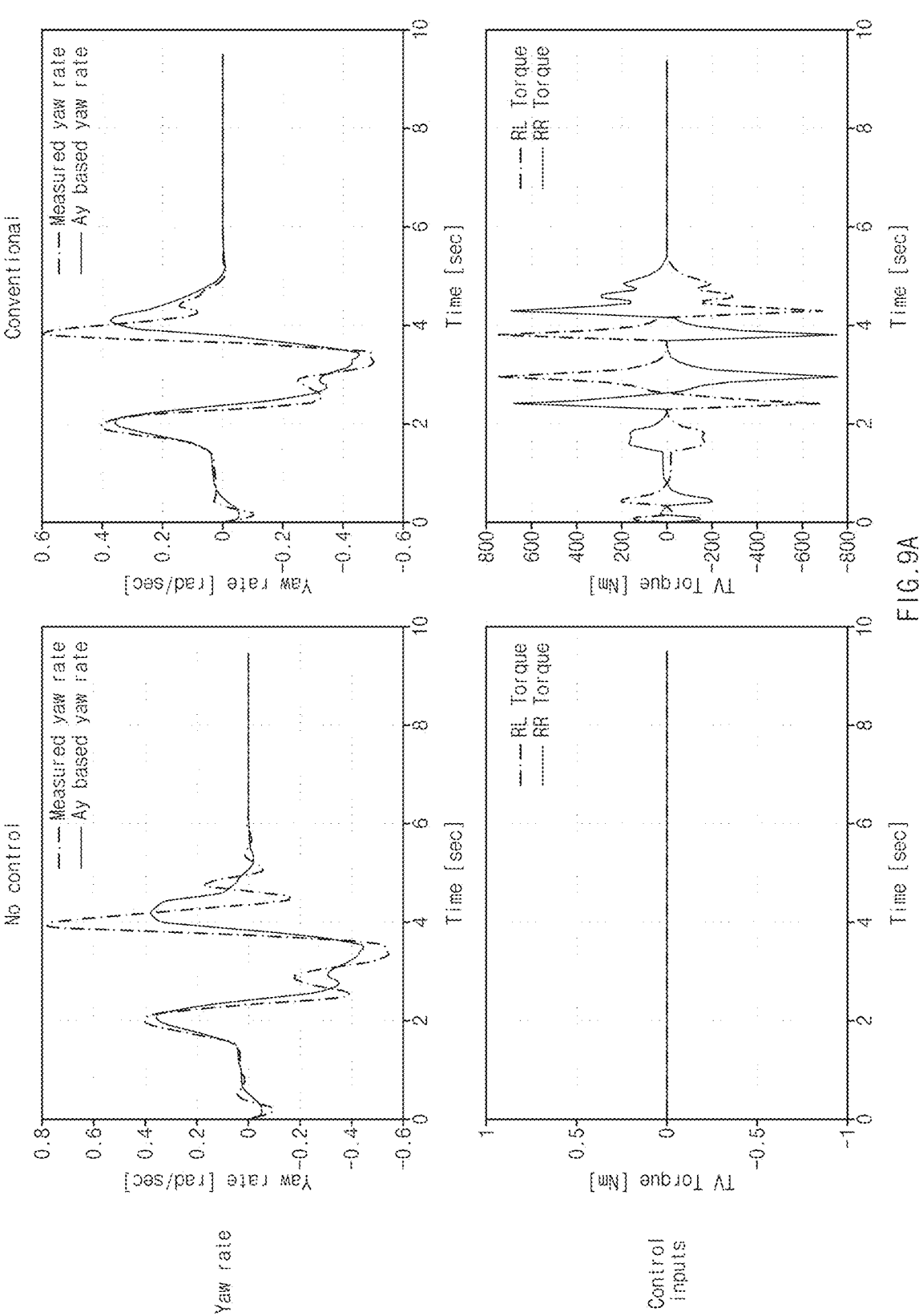
Figure 9B:
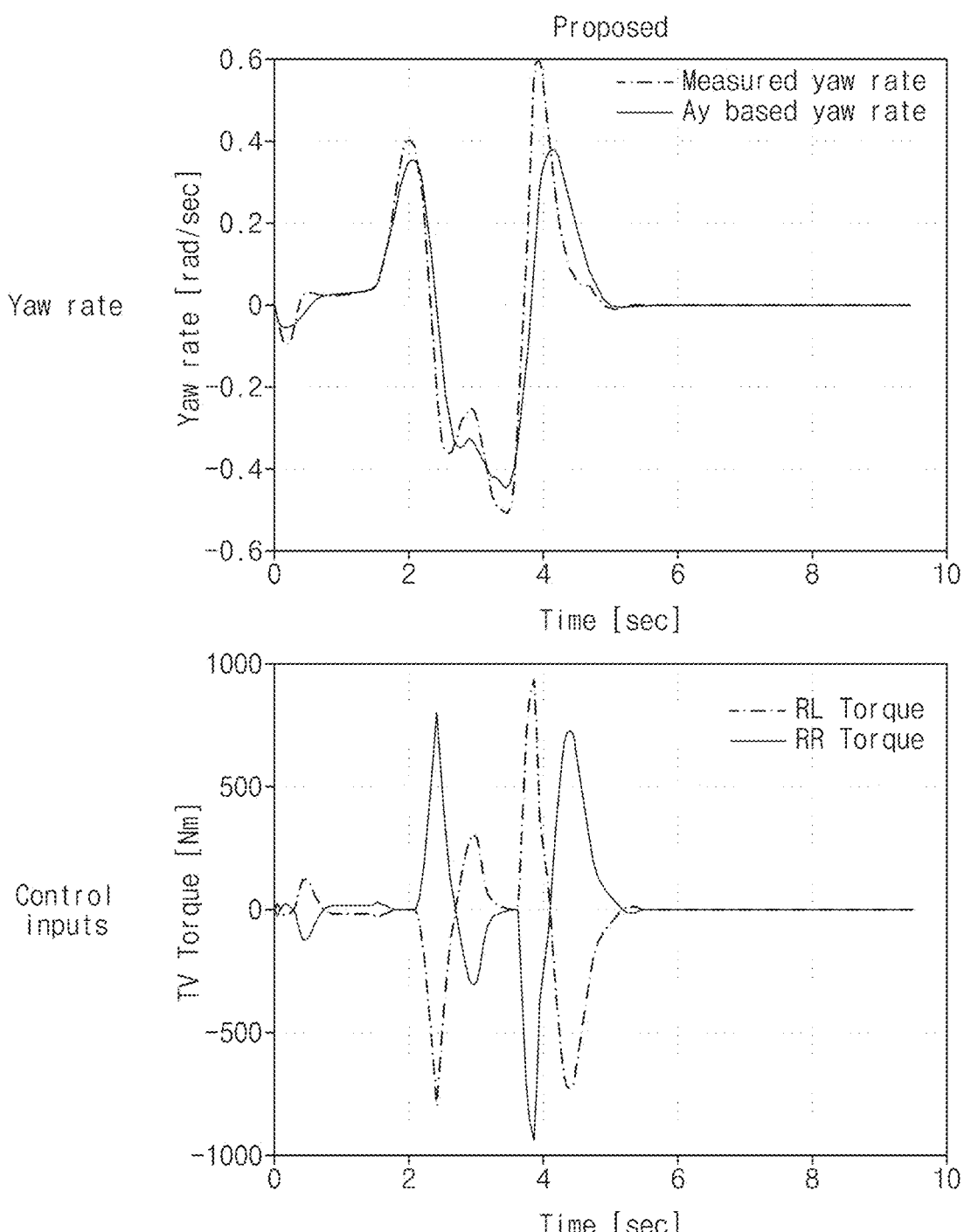
Figure 10:
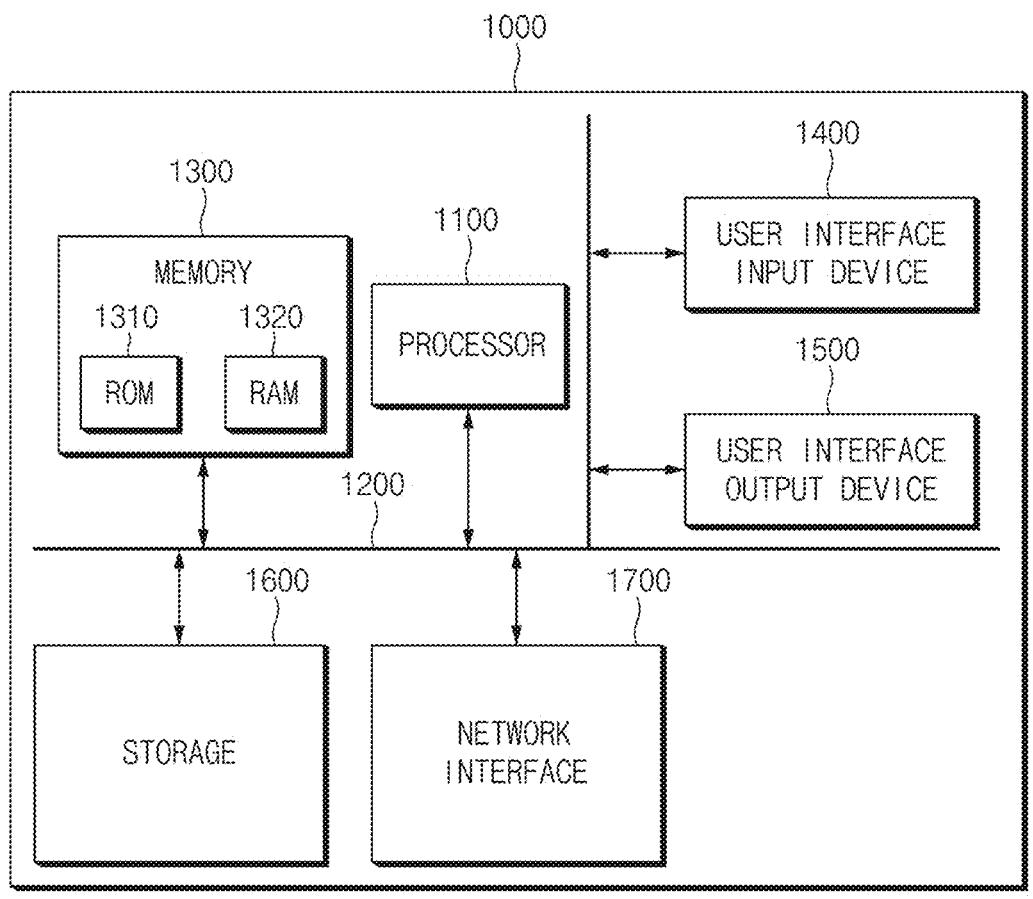

FIG. 7B is a drawing illustrating an open-loop left-turn simulation result of the present disclosure according to a yaw rate and a control input;

FIG. 8A is a drawing illustrating a relationship between a yaw rate and lateral acceleration among dual lane change (DLC) (e.g., ISO3888-2) simulation result values associated with applying a comfortable driving control mode of the present disclosure;

FIG. 8B is a drawing illustrating a change in yaw rate among DLC simulation result values associated with applying a comfortable driving control mode of the present disclosure;

FIG. 8C is a drawing illustrating a change in lateral acceleration among DLC left-turn simulation result values associated with applying a comfortable driving control mode of the present disclosure;

FIG. 9A is a drawing illustrating a general DLC simulation result according to a yaw rate and a control input;

FIG. 9B is a drawing illustrating a DLC simulation result of the present disclosure according to a yaw rate and a control input; and FIG. 10 illustrates a computing system according to an embodiment of the present disclosure.

DETAILED DESCRIPTION

Hereinafter, some embodiments of the present disclosure are described in detail with reference to the accompanying drawings. In adding the reference numerals to the components of each drawing, it should be noted that identical components are designated by the identical reference numerals even when they are displayed on other drawings. Further, in describing embodiments of the present disclosure, a detailed description of well-known features or functions has been ruled out in order not to unnecessarily obscure the gist of the present disclosure.

In describing the components of embodiments according to the present disclosure, terms such as first, second, "A", "B", (a), (b), and the like may be used. These terms are merely intended to distinguish one component from another component. These terms do not limit the nature, sequence or order of the corresponding components. Furthermore, unless otherwise defined, all terms including technical and scientific terms used herein have the same meaning as being generally understood by those having ordinary skill in the art to which the present disclosure pertains. Also, such terms as those defined in a generally used dictionary are to be interpreted as having meanings consistent with the contextual meanings in the relevant field of art. Such terms are not to be interpreted as having ideal or excessively formal meanings unless clearly defined as having such in the present application. When a component, device, element, or the like, of the present disclosure, is described as having a purpose or performing an operation, function, or the like, the component, device, or element should be considered herein as being "configured to" meet that purpose or to perform that operation or function.

Hereinafter, a vehicle to which a torque vectoring control method of the present disclosure is applied is not limited to a specific scheme such as front-wheel drive, rear-wheel drive, or four-wheel drive. Furthermore, the torque vectoring control method of the present disclosure is not limited to a specific device for torque vectoring control. For example, the torque vectoring control method of the present disclosure may be applied to a vehicle using one or more rear-wheel torque vectoring actuators (or motors) or may be applied to an in-wheel system in which a motor is disposed in a wheel for torque vectoring control, or the like. The in-wheel system is a system in which a motor is loaded into a wheel and is changed in a driving system from a convetional internal combustion engine to an electrification system. As the motor is loaded into the wheel, the in-wheel system may quickly support responsiveness from a command for a driving response and may provide the accuracy of control based on accurate torque measurement.

Hereinafter, embodiments of the present disclosure are described in detail with reference to FIGS. 1-10.

Figure 1:
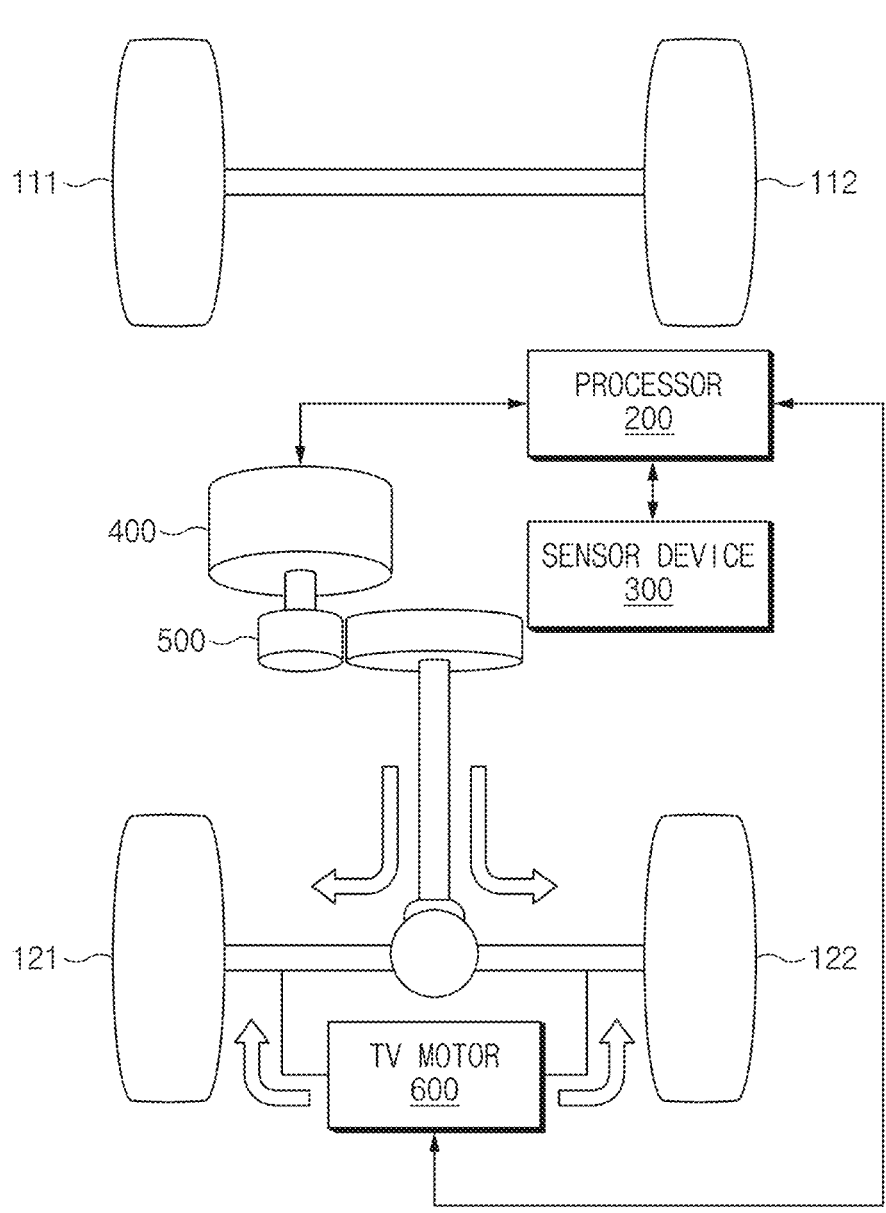
FIG. 1 is a block diagram illustrating at least some of components of a vehicle for supporting torque vectoring control according to an embodiment of the present disclosure.

FIG. 1 is a block diagram illustrating at least some components of a vehicle for supporting torque vectoring control according to an embodiment of the present disclosure.

Referring to FIG. 1, a vehicle 100 for supporting torque vectoring control according to an embodiment of the present disclosure may include front wheels 111 and 112, rear wheels 121 and 122, a driving device 400, a reduction gear 500, a torque vectoring (TV) motor 600, a processor 200 (or a vehicle controller, an engine controller, or a motor controller), and a sensor device 300. In addition, the vehicle 100 may further include connection devices (e.g., shafts and gears) for connecting the front wheels 111 and 112 with the driving device 400. The vehicle 100 may also include wires for connecting the processor 200 with the driving device 400, the TV motor 600, or the like and wires for connecting the sensor device 300 with the processor 200. The vehicle 100 may also include connection devices (e.g., shafts and gears) for connecting the reduction gear 500 with the rear wheels 121 and 122. Furthermore, the vehicle 100 may include a vehicle body, a brake system, a steering system, and other systems associated with supporting various user functions in the vehicle 100. Hereinafter, only some components associated with torque vectoring control according to an embodiment of the present disclosure are described as an example.

The front wheels 111 and 112 may include the left front wheel 111 and the right front wheel 112, which are arranged in the front of the vehicle 100. As the form where the TV motor 600 controls the rotation of the rear wheels 121 and 122 is illustrated in the illustrated drawing, connection relationships between the front wheels 111 and 112 and the TV motors 600 are not illustrated. However, when torque vectoring is applied to four wheels, a torque vectoring control scheme of the present disclosure may also be applied to the front wheels 111 and 112. The vehicle 100 may further include connection devices for connecting the TV motor 600 with the front wheels 111 and 112. The structure where the driving device 400 is connected with the rear wheels 121 and 122 is illustrated in the illustrated drawing, but the present disclosure is not limited thereto. The front wheels 111 and 112 may be connected with the driving device 400 (or the reduction gear 500). At least one sensor included in the sensor device 300 may be disposed in at least one of the front wheels 111 and 112. A shaft for connecting wheels may be disposed between the front wheels 111 and 112.

The rear wheels 121 and 122 may include the left rear wheel 121 and the right rear wheel 122, which are arranged in the rear of the vehicle 100. When the vehicle 100 has a rear-wheel drive scheme, the rear wheels 121 and 122 may be connected with the driving device 400 (or the reduction gear 500 connected with the driving device 400) through at least one shaft and at least one gear. Furthermore, the rear wheels 121 and 122 may be connected with the TV motor 600. Hereinafter, the structure where the TV motor 600 for torque vectoring control is connected with the rear wheels 121 and 122 is described as an example. At least one sensor included in the sensor device 300 may be disposed in at least one of the rear wheels 121 and 122 (or the rear wheels 121 and 122 or the front wheels 111 and 112). A shaft for connecting wheels may be disposed between the rear wheels 121 and 122. The rear wheels 121 and 122 may rotate at a certain speed by power delivered by the driving device 400. Rotation amounts of the left rear wheel 121 and the right rear wheel 122 may be different from each other, under power control of the TV motor 600 in a situation such as rotation or U-turn.

The driving device 400 may include a device that generates power for driving of the vehicle 100. The driving device 400 may include at least one of, for example, an engine for generating power using specific fuel, a device for generating power for driving the vehicle 100, or a device for charging and discharging power for driving the vehicle 100. As such, the technology associated with torque vectoring control of the present disclosure is not limited to a type and a size of the driving device 400 or arrangement of the driving device 400 in the vehicle 100. The driving device 400 may be understood as a device capable of generating power capable of rotating at least one of the rear wheels 121 and 122 or the front wheels 111 and 112.

The reduction gear 500 may include a device capable of being connected with the driving device 400 to decelerate according to a specific gear ratio in a process of delivering torque generated by the driving device 400 to a gear. The reduction gear 500 may be added or excluded according to a change in design of the vehicle 100.

The TV motor 600 may differently control amounts of rotation of the left rear wheel 121 and the right rear wheel 122 under control of the processor 200. In this regard, the TV motor 600 may be disposed at a point where the left rear wheel 121 and the right rear wheel 122 branch to differently control amounts of rotation of the respective wheels. As an example, power control of the TV motor 600 of the present disclosure may include a comfortable driving control mode (or a chauffeur mode). The comfortable driving g control mode may allow a difference between a change in lateral acceleration upon rotation of the vehicle 100 and a change in a yaw rate (a change in angle formed by a center line of the vehicle 100 and a direction of progress of the vehicle 100 or a difference between a lateral acceleration phase and a yaw rate phase) to be less than a predetermined reference value or be minimized. Power control of the TV motor 600 may also include an agile rotation control mode for applying a target yaw rate designed based on a steering angle and a vehicle speed of the vehicle 100 to the rear wheels 121 and 122. The agile rotation control mode may allow the vehicle 100 to more quickly rotate than a predetermined criterion upon rotation of the vehicle 100.

The sensor device 300 may include various sensors for collecting various pieces of information associated with operation of the vehicle 100. For example, the sensor device 300 may include at least one of: a sensor capable of sensing a steering angle of the vehicle 100 or a change in the steering angle; a sensor capable of sensing a change in yaw rate; a sensor capable of sensing a longitudinal speed of the vehicle 100; a sensor capable of sensing lateral acceleration of the vehicle 100; and/or a sensor capable of sensing a passenger that is riding in the vehicle 100. The at least one sensor included in the sensor device 300 may be activated in real time, at a certain period, or according to a change in direction of motion of the vehicle 100 and speed of the vehicle 100 to collect sensing information.

The processor 200 may deliver, store, or process a signal associated with controlling the operation of the vehicle 100.

8

Figure 2:
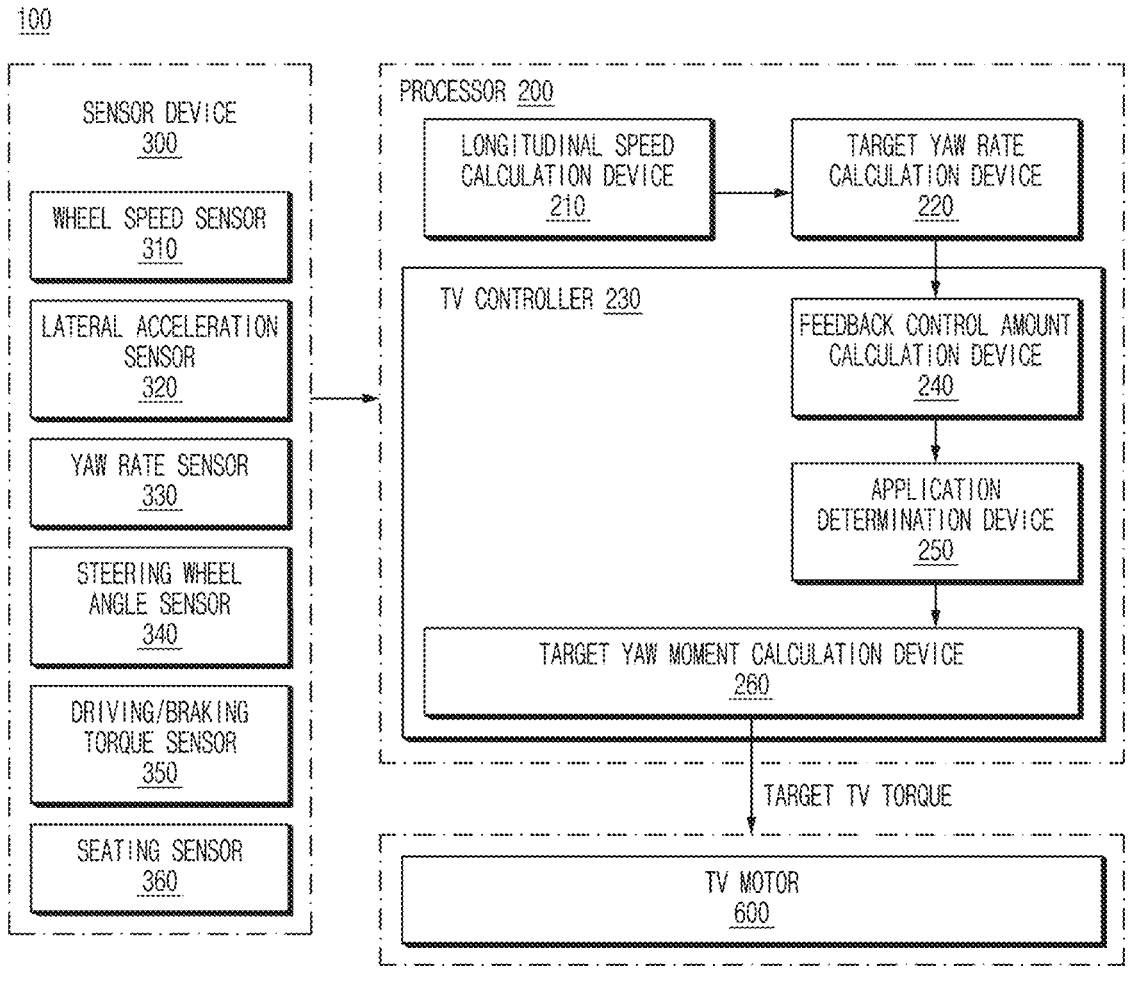
FIG. 2 is a drawing illustrating an example of some components associated with torque vectoring control among components of a vehicle according to an embodiment of the present disclosure.
Figure 3:
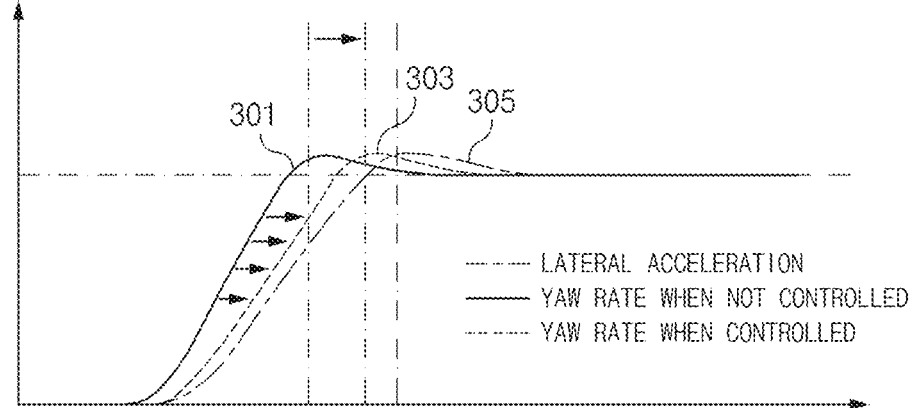
FIG. 3 is a drawing for describing a concept of reducing a phase difference between a yaw rate and lateral acceleration according to an embodiment of the present disclosure.

FIG. 2 is a drawing illustrating an example of some components associated with torque vectoring control among components of a vehicle according to an embodiment of the present disclosure. FIG. 3 is a drawing for describing a concept of reducing a phase difference between a yaw rate and lateral acceleration according to an embodiment of the present disclosure.

Referring to FIGS. 1 and 2, a vehicle 100 of the present disclosure may include at least a sensor device 300, a processor 200, and a TV motor 600. The vehicle 100 may further include wheels, where left and right rotation amounts of which are varied according to control of the TV motor 600.

The sensor device 300 may include at least one of a wheel speed sensor 310, a lateral acceleration sensor 320, a yaw rate sensor 330, a steering wheel angle sensor 340, a driving/braking torque sensor 350, and/or a seating sensor 360. The wheel speed sensor 310 may sense a speed of a wheel included in the wheels. For example, the vehicle 100 may calculate a vehicle speed based on wheel speed sensing information provided by the wheel speed sensor 310.

The lateral acceleration sensor 320 may sense lateral acceleration of the vehicle 100. As an example, in a process where the vehicle 100 travels or makes a U-turn on a curved road, the lateral acceleration sensor 320 may sense lateral acceleration of the vehicle 100. The lateral acceleration sensor 320 may collect real-time sensing information or may collect sensing information when the vehicle 100 travels on a curved road.

The yaw rate sensor 330 may be disposed to sense a yaw rate of the vehicle 100. The yaw rate sensor 330 may be disposed at various locations of the vehicle 100. As an example, the yaw rate sensor 330 may be disposed at the center of gravity of the vehicle 100.

The steering wheel angle sensor 340 may collect sensing information about a steering state of the vehicle 100. For example, the steering wheel angle sensor 340 may be connected with a steering wheel to sense the rotation of the steering wheel. The steering wheel angle sensor 340 may be disposed at a specified point of the wheel of the vehicle 100 to sense information about a steering angle of the vehicle 100, thus delivering the sensed information to the processor 200.

The driving/braking torque sensor 350 may be disposed to sense driving torque and braking torque of the vehicle 100. In this regard, the driving/braking torque sensor 350 may include a driving torque sensor and a braking torque sensor. Each sensor may be disposed adjacent to a driving device and a braking device.

The seating sensor 360 may collect sensing information about whether there is a passenger in the vehicle 100 or where the passenger is seated and may deliver the collected sensing information to the processor 200. The seating sensor 360 may be driven when the ignition of the vehicle 100 is turned on and may collect sensing information about whether and/or where a passenger is seated depending on whether the door of the vehicle 100 is opened or closed or in real time.

The processor 200 may control at least one of collection and processing of various pieces of information associated with controlling driving of the vehicle 100 and storing and delivery of the various pieces of information. As an example, the processor 200 may control to activate or deactivate at least one sensor included in the sensor device 300. Furthermore, the processor 200 may control a time point when sensing information is collected from the at least one sensor included in the sensor device 300. For example, when the vehicle 100 operates the at least one sensor included in the sensor device 300, the processor 200 may collect sensing information in real time while maintaining an active state of the at least one sensor. The processor 200 may collect real-time sensing information or may collect related sensing information only when a specific event occurs (e.g., when a steering angle changes, when lateral acceleration changes, when a vehicle speed changes, or when driving and braking torque changes). Alternatively, the processor 200 may collect sensing information at only a time point when related sensing information is required for some sensors included in the sensor device 300. For example, when the steering wheel angle sensor 340 or the wheel speed sensor 310 provides sensing information of a predetermined certain value or more, the processor 200 may activate the lateral acceleration sensor 320 and the yaw rate sensor 330.

The processor 200 may automatically select any one of a comfortable driving control mode or an agile rotation control mode depending on the information delivered by the seating sensor 360. For example, when a driver is seated in only the driver's seat, the processor 200 may automatically select the agile rotation control mode. When there is a passenger in a predetermined specified seat (e.g., at least one of rear seats, when the driver's seat is a left front seat with respect to the direction of progress of the vehicle) among the seats of the vehicle 100, the processor 200 may automatically select the comfortable driving control mode. Alternatively, the vehicle 100 may provide a screen interface or an input device capable of selecting the comfortable driving control mode and the agile rotation control mode. The processor 200 may differently set a sensor activated according to the mode selection or sensing information collected according to the mode selection. For example, when the agile rotation control mode is selected, the processor 200 may activate the steering wheel angle sensor 340 and the wheel speed sensor 310 or may collect sensing information of the sensors (e.g., the steering wheel angle sensor 340 and the wheel speed sensor 310). The processor 200 may calculate a target yaw rate based on the pieces of sensing information (e.g., steering wheel angle information and wheel speed sensing information) and may apply the target yaw rate to amounts of rotation of rear wheels 121 and 122. Furthermore, when the comfortable driving control mode is selected, the processor 200 may activate the lateral acceleration sensor 320 and the yaw rate sensor 330 or may collect sensing information of the sensors (e.g., the lateral acceleration sensor 320 and the yaw rate sensor 330). The processor 200 may control to calculate a yaw moment to be applied to torque vectoring (e.g., a yaw moment for allowing a difference between a change in lateral acceleration and a change in yaw rate (or a difference between a lateral acceleration phase and a yaw rate phase) to be less than a predetermined reference value) based on the lateral acceleration sensing information and the yaw rate sensing information. The processor 200 may also apply the calculated yaw moment to a TV motor 600 at a predetermined certain time point.

In this regard, the processor 200 may include a longitudinal speed calculation device 210, a target yaw rate calculation device 220, and a TV controller 230. The processor 200, including such components, may generate a yaw moment Mz of the TV motor 600 capable of controlling each of amounts of rotation of the rear wheels 121 and 122. The processor 200 also and may control a yaw rate r of the vehicle 100 when not controlled control a phase difference with lateral acceleration Ay 305 of the vehicle 100 to be reduced, thus operating such that the yaw rate 301 when not controlled becomes a yaw rate 303 when controlled, as shown in FIG. 3.

The longitudinal speed calculation device 210 may calculate a longitudinal speed of the vehicle 100 using at least a portion of sensing information collected by the sensor device 300. For example, the longitudinal speed calculation device 210 may calculate a longitudinal speed of the vehicle 100 based on sensing information delivered from the wheel speed sensor 310 and the steering wheel angle sensor 340. The longitudinal speed calculation device 210 may deliver the calculated longitudinal speed to the target yaw rate calculation device 220.

The target yaw rate calculation device 220 may calculate a target yaw rate based on a vehicle speed and lateral acceleration depending on a kinematic relationship. In detail, the lateral acceleration may be expressed as Equation 1 below.

$$A_y = V_x(\beta + r) - g\sin(\Phi) \qquad \text{Equation 1}$$

In Equation 1 above, $A_y$ may correspond to the lateral acceleration, $\beta$ may correspond to the slip angle in the normal steering state, $V_x$ may correspond to the estimated lateral acceleration, r may correspond to the yaw rate, and g sin ($\Phi$) may correspond to the road surface bank angle. In Equation 1 above, assuming that the road surface bank angle is ignored with respect to the lateral acceleration and the lateral slip angular speed or the slip angle in the normal steering state is "0", the target yaw rate where the lateral acceleration and the phase are the same as each other may be defined as Equation 2 below.

$$r_{target} = \frac{A_y}{V_x} \qquad \text{Equation 2}$$

In Equation 2 above, $r_{target}$ may denote the target yaw rate, $V_x$ may denote the longitudinal speed estimated through the sensing information, and $A_y$ may denote the lateral acceleration. Equation 2 above may represent a kinematic relationship between the lateral acceleration and the yaw rate. The target yaw rate calculation device 220 may calculate a ratio of the above-mentioned lateral acceleration to the estimated longitudinal speed and may provide the calculated value to the TV controller 230.

When receiving the target yaw rate, the TV controller 230 may calculate a yaw moment corresponding to the received target yaw rate using a proportional derivative (PD) controller. The TV controller 230 may limit the calculated yaw moment to be distributed at only a time point when the yaw w moment is effectively generated by the TV motor 600 with regard to a characteristic where a longitudinal force and a lateral force are coupled to each other. In this regard, the processor 200 may further a distributor for distribution of target yaw moment.

In this regard, the TV controller 230 may include a feedback control amount calculation device 240, an application determination device 250, and a target yaw moment calculation device 260.

When the target yaw moment is provided from the target yaw moment calculation device 260, the feedback control amount calculation device 240 may calculate an amount of feedback control for the target yaw moment. For example, the feedback control amount calculation device 240 may apply the currently calculated target yaw moment to previously stored data or a previously stored algorithm to calculate an amount of control to be applied to the TV motor 600.

The application determination device 250 may identify a magnitude of the amount of feedback control delivered by the feedback control amount calculation device 240 and may identify whether the magnitude meets a predetermined reference condition. For example, the application determination device 250 may identify a lateral force acting on the vehicle 100 and a direction of the yaw moment. In conjunction with identifying the lateral force, the application determination device 250 may collect sensing information in which air pressure of the wheel of the vehicle 100 is sensed and may identify a magnitude of the lateral force which is being applied to the vehicle 100 in a curved section with respect to the collected air pressure. In this regard, the vehicle 100 may further include a sensor (e.g., an air pressure sensor) capable of sensing air pressure applied to the wheel of the vehicle 100. As an example, the predetermined reference condition may include a condition where both the lateral force and the yaw moment have positive values in a situation where the vehicle 100 makes a left turn or a condition where both the lateral force and the yaw moment have negative values in a situation where the vehicle 100 makes a right turn.

When it is determined to control the TV motor 600 depending on the determination of the application determination device 250, the yaw moment calculation device 260 may determine an amount or rotation to be applied to the wheel depending on the magnitude of the yaw moment and may generate and provide control information according to the determined amount of rotation (e.g., an amount of control of the TV motor 600) to the TV motor 600. As an example, when both the lateral force and the yaw moment are positive on the left turn, the target yaw moment calculation device 260 may add a first additional rotation amount in a counterclockwise direction to the left rear wheel 121 and may add a second additional rotation amount in a clockwise direction to the right rear wheel 122 while providing a default amount of rotation provided to the rear wheels 121 and 122 (e.g., an amount of rotation necessary for a current driving speed). Herein, the first additional rotation amount and the second additional rotation amount may be different from each other depending on at least one of a weight of the vehicle 100, a magnitude of a steering angle of the vehicle 100, or a speed of progress of the vehicle 100. Furthermore, the first additional rotation amount and the second additional rotation amount may be differently set according to a situation. As an example, when both the lateral force and the yaw moment are negative on the right turn, the above-mentioned target yaw moment calculation device 260 may add a third additional rotation amount in the counterclockwise direction to the left rear wheel 121 and may add a fourth additional rotation amount in the clockwise direction to the right rear wheel 122 while providing a default amount of rotation provided to the rear wheels 121 and 122 (e.g., an amount of rotation necessary for a current driving speed). Each of the third additional rotation amount and the fourth additional rotation amount may be set to be the same as each of the first additional rotation amount and the second additional rotation amount in the same vehicle condition (e.g., weight, speed, or steering angle).

Figure 4:
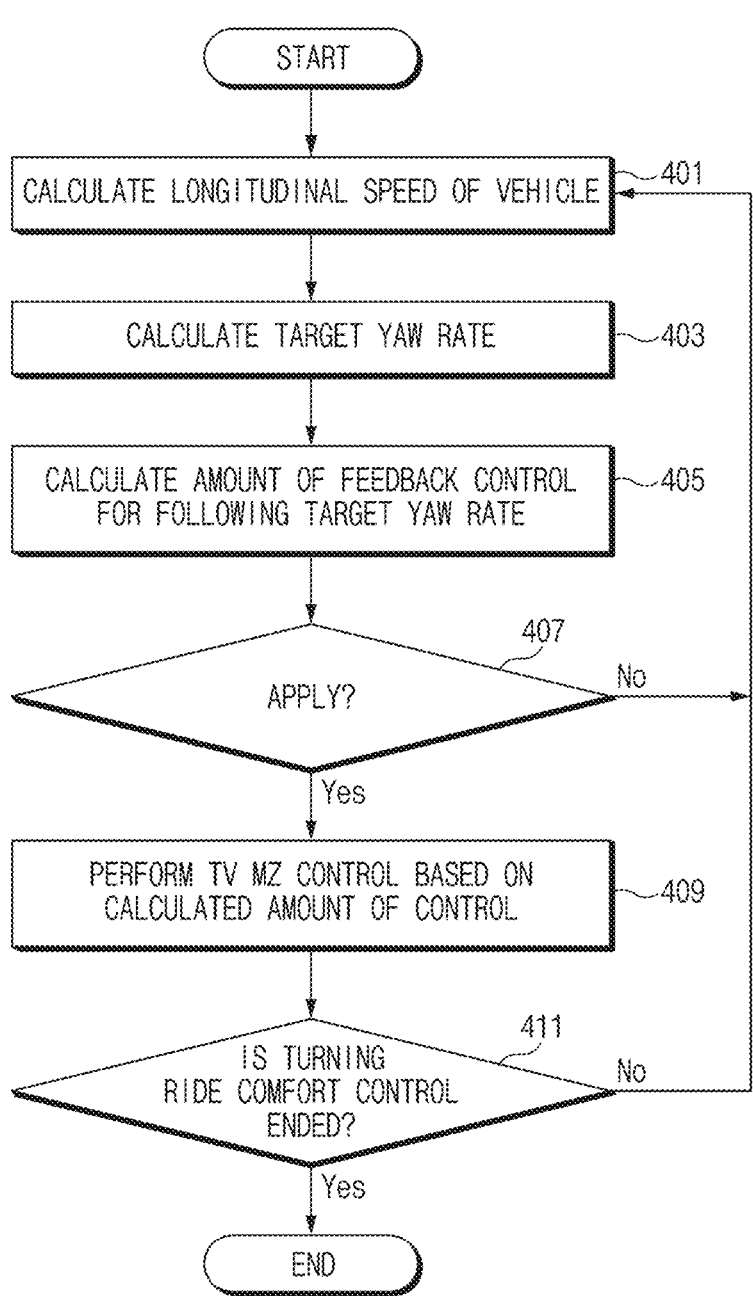
FIG. 4 a flowchart for describing an example of a vehicle control method according to an embodiment of the present disclosure.
Figure 5A:
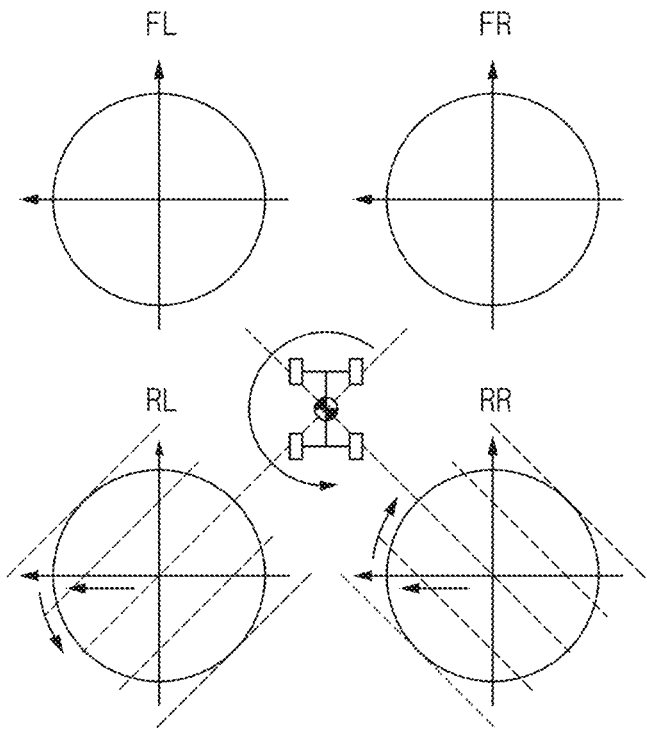
FIG. 5A is a drawing for describing operation of a distributor in a first condition according to an embodiment of the present disclosure.
Figure 5B:
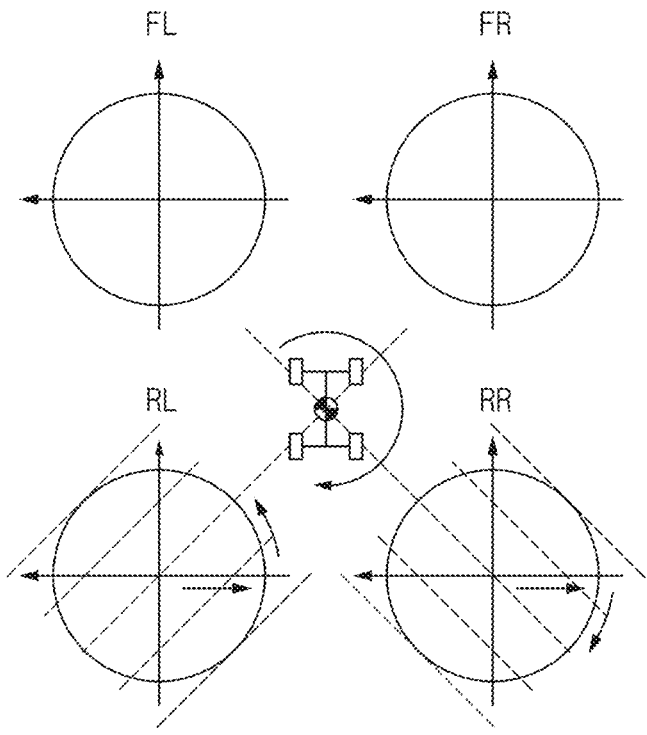
FIG. 5B is a drawing for describing operation of a distributor in a second condition according to an embodiment of the present disclosure.

Hereinafter, a description is given of an example of a vehicle control method according to an embodiment of the present disclosure with reference to FIGS. 4-5B. FIG. 4 is a flowchart for describing an example of a vehicle control method according to an embodiment of the present disclosure. FIG. 5A is a drawing for describing operation of a distributor in a first condition according to an embodiment of the present disclosure. FIG. 5B is a drawing for describing operation of a distributor in a second condition according to an embodiment of the present disclosure. Hereinafter, it is assumed that processes of FIGS. 1 and 2 perform a comfortable driving control mode.

Referring to FIG. 4, in operation 401, a processor 200 of a vehicle 100 may calculate a longitudinal speed of a vehicle. In conjunction with calculating the longitudinal speed of the vehicle, the processor 200 may collect sensing information necessary to calculate the longitudinal speed of the vehicle from a sensor device 300. For example, the processor 200 may collect at least a portion of wheel speed sensing information and steering wheel angle sensing information from the sensor device 300. As an example, when the vehicle is traveling on a straight road without its steering, the processor 200 may calculate a longitudinal speed of the vehicle 100 using only wheel speed sensing information. The processor 200 of the vehicle 100 may identify a currently set mode. For example, the processor 200 may identify a current selection of a comfortable driving control mode or an agile rotation control mode depending to a driver input. Alternatively, when there is no separate driver input, the processor 200 may automatically select a previously set mode. As another example, the processor 200 may automatically select the comfortable driving control mode, when passengers of a predetermined number or more ride in the vehicle 100 or when there are passengers on predetermined seats, based on seating sensing information. The processor 200 may calculate a longitudinal speed of the vehicle to calculate a target yaw rate for operation of the selected mode, depending on the selected mode.

In operation 403, the processor 200 of the vehicle 100 may calculate a target yaw rate based on the calculated longitudinal speed of the vehicle. In this regard, the processor 200 may collect lateral acceleration sensing information from the sensor device 300 and may calculate the target yaw rate using the collected sensing information (e.g., the lateral sensing and acceleration information) the longitudinal speed of the vehicle. When the agile rotation control mode is set, the processor 200 may collect steering wheel angle information and may calculate a target yaw rate based on the steering wheel angle information and the longitudinal speed of the vehicle.

In operation 405, the processor 200 of the vehicle 100 may calculate an amount of feedback control for following the target yaw rate. For example, the processor 200 may calculate a yaw moment corresponding to the target yaw rate using a differential-integral controller.

In operation 407, the processor 200 of the vehicle 100 may determine whether to apply the amount of feedback control (or the yaw moment) to current operation of the vehicle 100. In this regard, the processor 200 may estimate a yaw moment occurrence effect when the calculated yaw moment is applied to an operation of a TV motor 600 using a concept of a yaw moment contour and may identify whether the estimated effect is greater than or equal to a predetermined reference value. In this regard, the processor 200 may provide an algorithm or a simulation environment for applying the calculated yaw moment. In this regard, as shown in FIG. 5A, the processor 200 may estimate or determine whether a rear wheel lateral force Fyr is positive and whether a yaw moment Mz is positive (or in a counterclockwise direction). Furthermore, as shown in FIG. 5B, the processor 200 may estimate or determine whether a rear wheel lateral force Fyr is negative and whether a yaw moment Mz is negative (or in a clockwise direction). When there is a case except for the above-mentioned two cases in FIGS. 5A and 5B, the processor 200 may branch to operation 401 to perform the operation again after operation 401. When corresponding to the above-mentioned two cases in FIGS. 5A and 5B, the processor 200 may perform a next operation. In FIGS. 5A and 5B, FL may refer to the left front wheel, FR may refer to the right front wheel, RL may refer to the left rear wheel, and RR may refer to the right rear wheel.

In operation 409, the processor 200 of the vehicle 100 may perform torque vectoring motor control (e.g., TV Mz control) based on the calculated amount of control (e.g., the target yaw moment). For example, as shown in FIG. 5A, when the vehicle 100 makes a left turn and when the rear wheel lateral force Fyr is positive and the yaw moment Mz is positive, the processor 200 of the vehicle 100 may control the TV motor 600 to control to additionally apply or generate torque in a counterclockwise direction on a left rear wheel between rear wheels 121 and 122 (e.g., add an amount of rotation in the counterclockwise direction to a default amount of rotation by a driving device). The processor 200 of the vehicle 100 may additionally apply torque in the clockwise direction to a right rear wheel between the rear wheels 121 and 122 (e.g., add an amount of rotation in the clockwise direction to the default amount of rotation by the driving device). Alternatively, when the vehicle 100 makes a left turn, the processor 200 may control the amount of rotation of the left rear wheel to be less than a reference value (e.g., an amount of rotation provided by the driving device) and may control the amount of rotation of the right rear wheel to be greater than the reference value. For another example, as shown in FIG. 5B, when the vehicle 100 makes a right turn and when the rear wheel lateral force Fyr is negative and the yaw moment Mz is negative, the processor 200 of the vehicle 100 may control the TV motor 600 to control to additionally apply torque in the counterclockwise direction on the left rear wheel between the rear wheels 121 and 122 and additionally apply torque in the clockwise direction to the right rear wheel between the rear wheels 121 and 122. Alternatively, the processor 200 may control the amount of rotation of the left rear wheel to be less than the reference value (e.g., the amount of rotation provided by the driving device) and may control the amount of rotation of the right rear wheel to be greater than the reference value.

In operation 411, the processor 200 of the vehicle 100 may identify whether an event for ending turning ride comfort control (e.g., ending a comfortable driving control mode) occurs. For example, the processor 200 may identify whether the vehicle 100 is traveling at a driving speed of a specified magnitude or more on a curved road having an angle of the specified magnitude or more. When at least one of the angle, the driving speed, or any combination thereof is less than the magnitude, the processor 200 may end the above-mentioned comfortable driving control mode. Alternatively, the processor 200 may identify whether an input signal of a driver (e.g., an input signal for ending the comfortable driving control mode) occurs. When a separate input signal occurs, the processor 200 may end the mode. When a separate event for ending the turning ride comfort control does not occur, the processor 200 may branch to operation 401 to perform the operation again from operation 401.

Figure 6A:
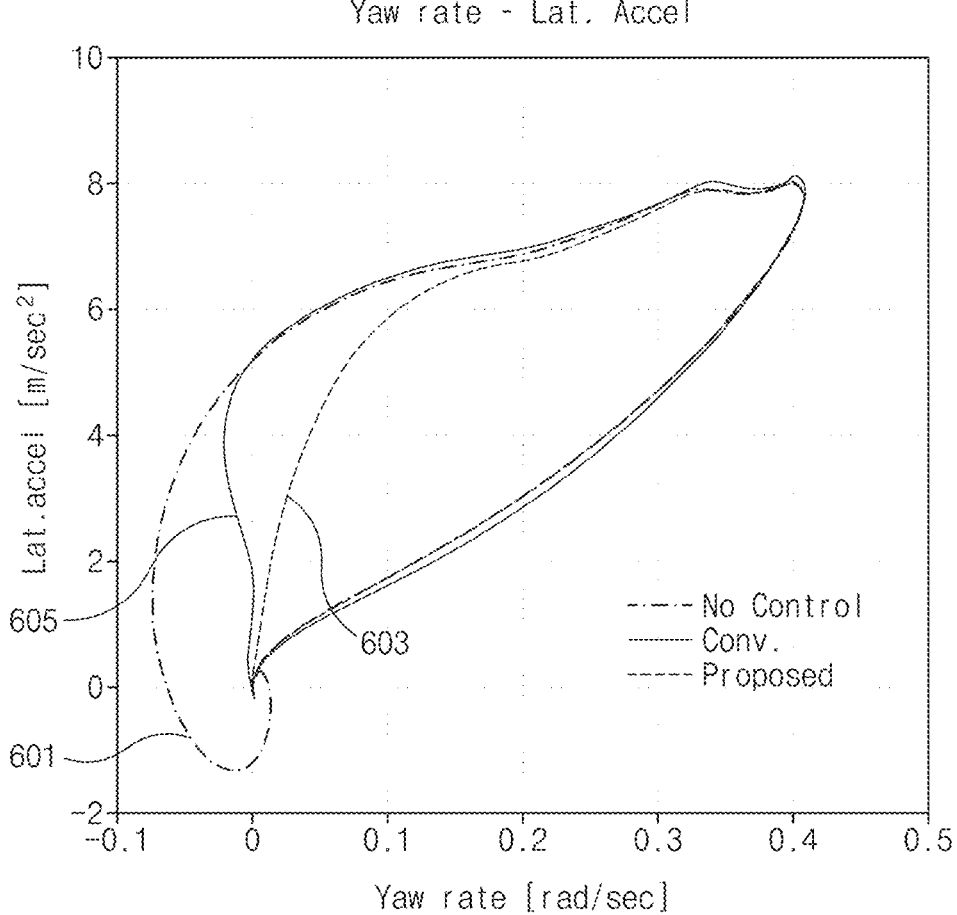
FIG. 6A is a drawing illustrating a relationship between a yaw rate and lateral acceleration among open-loop left-turn simulation result values associated with applying a comfortable driving control mode of the present disclosure.
Figure 6B:
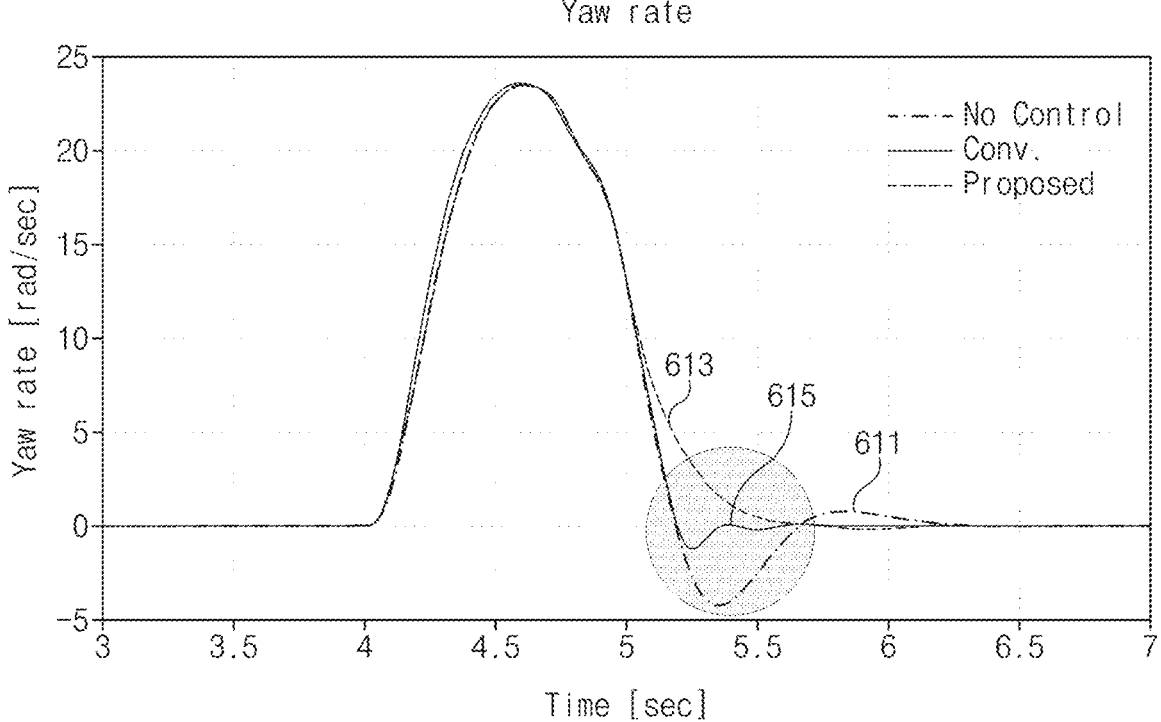
FIG. 6B is a drawing illustrating a change in yaw rate among open-loop left-turn simulation result values associated with applying a comfortable driving control mode of the present disclosure.
Figure 6C:
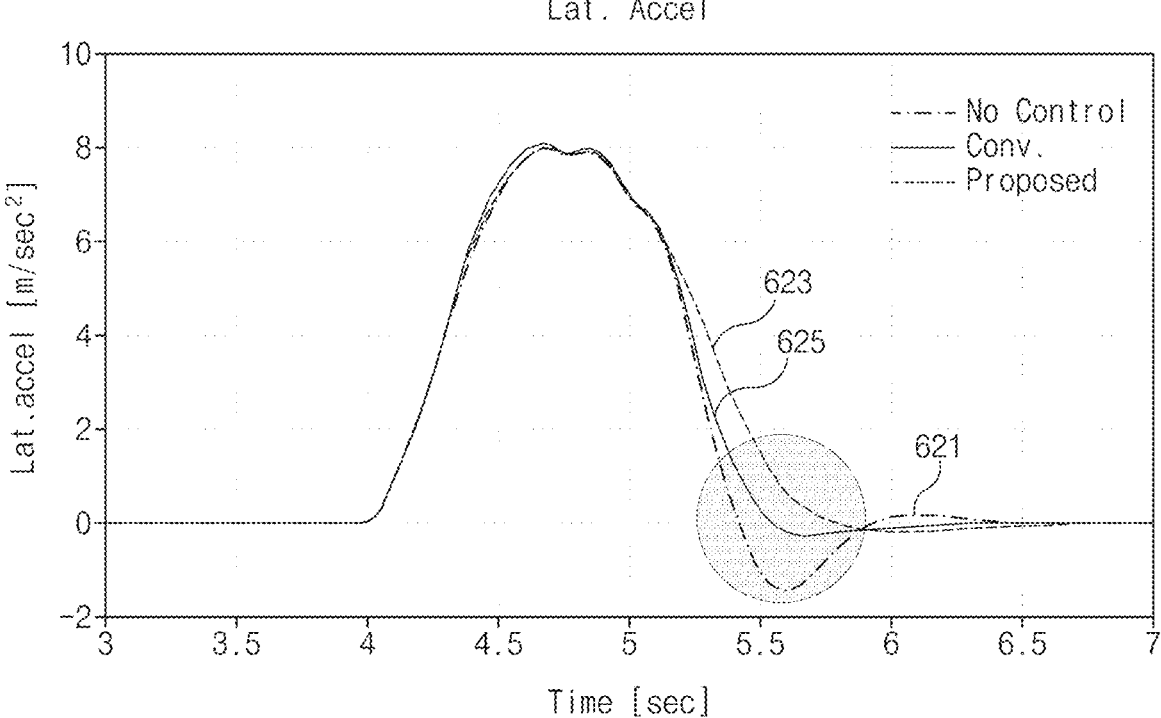
FIG. 6C is a drawing illustrating a change in lateral acceleration among open-loop left-turn simulation result values associated with applying a comfortable driving control mode of the present disclosure.

FIG. 6A is a drawing illustrating a relationship between a yaw rate and lateral acceleration among open-loop left-turn simulation result values associated with applying a comfortable driving control mode of the present disclosure. FIG. 6B is a drawing illustrating a change in yaw rate among open-loop left-turn simulation result values associated with applying a comfortable driving control mode of the present disclosure. FIG. 6C is a drawing illustrating a change in lateral acceleration among open-loop left-turn simulation result values associated with applying a comfortable driving control mode of the present disclosure. Open-loop left-turn simulation results in FIGS. 6A-6C are calculated in conditions of single sine steering and slalom steering, while a vehicle enters a curved section in a left direction at 80 kilometers per hour (kph).

Referring to FIG. 6A, a first yaw rate-lateral acceleration relationship 601 in a situation where there is no separate torque vectoring control (no control) shows a larger amount of change than a relationship 603 between a second yaw rate and lateral acceleration in an open-loop left-turn result to which the comfortable driving control mode of the present disclosure is applied (proposed) and a third yaw rate-lateral acceleration relationship 605 to which conventional (conv.) torque vectoring control is applied. Furthermore, it may be seen that the relationship 603 between the second yaw rate and the lateral acceleration in the open-loop left-turn result to which the comfortable driving control mode of the present disclosure is applied shows a less amount of change than the third yaw rate-lateral acceleration relationship 605 to which the conventional torque vectoring control is applied.

Referring to FIG. 6B, a first yaw rate change 611 at a turning end time point in a situation where there is no separate torque vectoring control shows a larger amount of change than a second yaw rate change 613 at a turning end time point to which the comfortable driving control mode of the present disclosure is applied and a third yaw rate change 615 at a turning end time point to which the conventional torque vectoring control is applied. Furthermore, it may be seen that the second yaw rate change 613 at the turning end time point to which the comfortable driving control mode of the present disclosure is applied shows a less amount of change than the third yaw rate change 615 at the turning end time point to which the conventional torque vectoring control is applied.

Referring to FIG. 6C, a first lateral acceleration change 621 at a turning end time point in a situation where there is no separate torque vectoring control shows a larger amount of change than a second lateral acceleration change 623 at a tuning end time point to which the comfortable driving control mode of the present disclosure is applied and a third lateral acceleration change 625 at a tuning end time point to which the conventional torque vectoring control is applied. Furthermore, it may be seen that the second lateral acceleration change 623 at the turning end time point to which the comfortable driving control mode of the present disclosure is applied shows a less amount of change than the third lateral acceleration change 625 at the tuning end time point to which the conventional torque vectoring control is applied.

FIG. 7A is a drawing illustrating a general open-loop left-turn simulation result according to a yaw rate and a control input. FIG. 7B is a drawing illustrating an open-loop left-turn simulation result of the present disclosure according to a yaw rate and a control input.

As shown in FIGS. 7A and 7B, it may be seen that torque of a left rear wheel and torque of a right rear wheel are the same as each other, in a situation where there is no control input. Also, as shown, a greater yaw rate according to it is shown than an example to which conventional control (or an agile rotation control mode) is applied and an example to which a comfortable driving control mode of the present disclosure is applied in a phase difference between the measured yaw rate and yaw rate-based lateral acceleration.

Furthermore, it may be seen that, in the examples to which the conventional control and the comfortable driving control mode of the present disclosure are applied, torque symmetrical to each other is added to the left rear wheel and the right rear wheel. The comfortable driving control mode of the present disclosure yields a gentler curve than the conventional control. As a result, it may be seen that the comfortable driving control mode of the present disclosure provides smoother curve driving than the conventional control mode.

FIG. 8A is a drawing illustrating a relationship between a yaw rate and lateral acceleration among dual lane change (DLC) (e.g., ISO3888-2) simulation result values associated with applying a comfortable driving control mode of the present disclosure. FIG. 8B is a drawing illustrating a change in yaw rate among simulation result values associated with applying a comfortable driving control mode of the present disclosure. FIG. 8C is a drawing illustrating a change in lateral acceleration among DLC left-turn simulation result values associated with applying a comfortable driving control mode of the present disclosure. FIGS. 8A-8C illustrate changes in yaw rate and lateral acceleration when a vehicle travels at 80 km/h without its throttle.

Referring to FIG. 8A, a fourth yaw rate-lateral acceleration relationship 801 in a situation where there is no separate torque vectoring control yields a larger amount of change than a relationship 803 between a fifth yaw rate and lateral acceleration in a DLC simulation result to which the comfortable driving control mode of the present disclosure is applied and a sixth yaw rate-lateral acceleration relationship 805 to which conventional torque vectoring control is applied. Furthermore, it may be seen that the relationship 803 between the fifth yaw rate and the lateral acceleration in the DLC result, to which the comfortable driving control mode of the present disclosure is applied, yields a gentler curve (corresponding to smoother driving) than the sixth yaw rate-lateral acceleration relationship 805 to which conventional torque vectoring control is applied.

Referring to FIG. 8B, a fourth yaw rate change 811 at a turning end time point in a situation where there is no separate torque vectoring control yields a larger amount of change than a fifth yaw rate change 813 at a turning end time point, to which the comfortable driving control mode of the present disclosure is applied, and a sixth yaw rate change 815 to which the conventional torque vectoring control is applied. Furthermore, it may be seen that the fifth yaw rate change 813 at the turning end time point to which the comfortable driving control mode of the present disclosure is applied yields a gentler curve than the sixth yaw rate change 815 at the turning end time point to which the conventional torque vectoring control is applied.

Referring to FIG. 8C, a fourth lateral acceleration change 821 at a turning end time point in a situation where there is no separate torque vectoring control yields a larger amount of change than a fifth lateral acceleration change 823 at a turning end time point to which the comfortable driving control mode of the present disclosure is applied and a sixth lateral acceleration change 825 at a turning end time point to which the conventional torque vectoring control is applied. Furthermore, it may be seen that the fifth lateral acceleration change 823 at the turning end time point, to which the comfortable driving control mode of the present disclosure is applied, yields a gentler curve than the sixth lateral acceleration change 825 at the turning end time point to which the conventional torque vectoring control is applied.

FIG. 9A is a drawing illustrating a general DLC simulation result according to a yaw rate and a control input. FIG. 9B is a drawing illustrating a DLC simulation result of the present disclosure according to a yaw rate and a control input.

As shown in FIGS. 9A and 9B, it may be seen that torque of a left rear wheel and torque of a right rear wheel are the same as each other, in a situation where there is no control input. Also, as shown, a greater yaw rate according to it is shown than an example, to which conventional control (or an agile rotation control mode) is applied and an example to which a comfortable driving control mode of the present disclosure is applied in a phase difference between the measured yaw rate and yaw rate-based lateral acceleration.

Furthermore, it may be seen that the comfortable driving control mode of the present disclosure indicates a gentler measurement yaw rate than the conventional control. It may be seen that a control input also provides smoother torque in the comfortable driving control mode of the present disclosure than in the conventional control.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200. The computing system 1000 described with reference to FIG. 10 may be a system, at least a part of which is applied to the vehicle 100 described above with reference to FIGS. 1-4.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read-only memory (ROM) 1310 and a random-access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (in other words, the memory 1300 and/or the storage 1600) such as a random-access memory (RAM), a flash memory, a read-only memory (ROM), an erasable programmable ROM (EPROM), an electrically erasable programmable (EEPROM), a register, a hard disc, a removable disk, and a compact-disc ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application-specific integrated circuit (ASIC). The ASIC may reside within a user terminal. In another case, the processor and the storage medium may reside in the user terminal as separate components.

The present technology may selectively provide a variety of ride comfort in a curved section of the vehicle.

Furthermore, the present technology may provide more stable operation at a time point when the vehicle drives in a curved section and deviates from the curved section.

In this regard, the present technology may reduce a phase difference between a yaw rate and lateral acceleration and may provide yaw rate damping reinforcement when turning is ended, thus assisting in more smoothly ending turning.

The present technology may more reduce lateral acceleration at the same steering angle, may more increase limited lateral acceleration, and may more improve traction agility and steering responsiveness, in an application vehicle than in a non-application vehicle.

In addition, various effects ascertained directly or indirectly through the present disclosure may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure are not limited by the embodiments. The scope of the present disclosure should be construed based on the accompanying claims, and all the technical ideas within the scope equivalent to the claims should be included in the scope of the present disclosure.

What is claimed is:

1. A vehicle to which torque vectoring control is applied, the vehicle comprising:

a processor configured to perform control associated with operation of the vehicle; and a storage storing at least one instruction for operation of the processor, wherein the processor is configured to calculate a longitudinal speed of the vehicle and lateral acceleration of the vehicle;

calculate a target yaw rate based on the longitudinal speed of the vehicle and the lateral acceleration of the vehicle;

calculate a target yaw moment based on the calculated target yaw rate;

apply the target yaw moment to a torque vectoring motor of the vehicle;

identify a magnitude of a lateral force applied to the vehicle and identify whether the magnitude of the lateral force and a direction of the target yaw moment meet a predetermined condition;

perform torque vectoring motor control according to the target yaw moment, when the predetermined condition is met; and skip the torque vectoring motor control according to the target yaw moment, when the predetermined condition is not met.

2. The vehicle of claim 1, wherein the processor is configured to apply the calculated target yaw rate to a differentiator-integrator to calculate the target yaw moment.

3. The vehicle of claim 1, wherein the processor is configured to determine that the predetermined condition is met when lateral forces of rear wheels of the vehicle are positive and the target yaw moment is in a counterclockwise direction in a process where the vehicle makes a left turn.

4. The vehicle of claim 3, wherein the processor is configured to:

add an additional amount of rotation in the counterclockwise direction to a left rear wheel of the vehicle; and add an additional amount of rotation in a clockwise direction to a right rear wheel of the vehicle, in the process where the vehicle makes the left turn.

5. The vehicle of claim 1, wherein the processor is configured to determine that the predetermined condition is met when lateral forces of rear wheels of the vehicle are negative and the target yaw moment is in a clockwise direction in a process where the vehicle makes a right turn.

6. The vehicle of claim 5, wherein the processor is configured to:

add an additional amount of rotation in a counterclockwise direction to a left rear wheel of the vehicle; and add an additional amount of rotation in the clockwise direction to a right rear wheel of the vehicle, in the process where the vehicle makes the right turn.

7. A torque vectoring control method, comprising:

collecting, by a processor configured to control operation of a vehicle, sensing information necessary to calculate a longitudinal speed of the vehicle and lateral acceleration of the vehicle at least using a sensor device disposed in the vehicle;

calculating, by the processor, the longitudinal speed of the vehicle and the lateral acceleration of the vehicle;

calculating, by the processor, a target yaw rate based on the longitudinal speed of the vehicle and the lateral acceleration of the vehicle;

calculating, by the processor, a target yaw moment based on the calculated target yaw rate;

applying, by the processor, the target yaw moment to a torque vectoring motor of the vehicle;

identifying, by the processor, a magnitude of a lateral force applied to the vehicle;

identifying, by the processor, whether the magnitude of the lateral force and a direction of the target yaw moment meet a predetermined condition;

performing, by the processor, torque vectoring motor control according to the target yaw moment, when the predetermined condition is met; and skipping, by the processor, the torque vectoring motor control according to the target yaw moment, when the predetermined condition is not met.

8. The torque vectoring control method of claim 7, wherein the calculating of the target yaw moment includes applying, by the processor, the calculated target yaw rate to a differentiator-integrator to calculate the target yaw moment.

9. The torque vectoring control method of claim 7, wherein the identifying of whether the predetermined condition is met includes determining, by the processor, that the predetermined condition is met when lateral forces of rear wheels of the vehicle are positive and the target yaw moment is in a counterclockwise direction in a process where the vehicle makes a left turn.

10. The torque vectoring control method of claim 9, wherein the performing of the torque vectoring motor control includes adding, by the processor, an additional amount of rotation in the counterclockwise direction to a left rear wheel of the vehicle and adding, by the processor, an additional amount of rotation in a clockwise direction to a right rear wheel of the vehicle, in the process where the vehicle makes the left turn.

11. The torque vectoring control method of claim 7, wherein the identifying of whether the predetermined condition is met includes determining, by the processor, that the predetermined condition is met when lateral forces of rear wheels of the vehicle are negative and the target yaw moment is in a clockwise direction in a process where the vehicle makes a right turn.

12. The torque vectoring control method of claim 11, wherein the performing of the torque vectoring motor control includes adding, by the processor, an additional amount of rotation in a counterclockwise direction to a left rear wheel of the vehicle and adding, by the processor, an additional amount of rotation in the clockwise direction to a right rear wheel of the vehicle, in the process where the vehicle makes the right turn.

13. A computing system for performing torque vectoring control, the computing system comprising:

a storage for operation of the computing system; and a processor operatively connected with the storage and configured to control operation of the vehicle, wherein the storage stores at least one instruction necessary for operation of the processor, and wherein the processor, according to the at least one instruction, is configured to collect sensing information necessary to calculate a longitudinal speed of the vehicle and lateral acceleration of the vehicle at least using a sensor device disposed in the vehicle, calculate the longitudinal speed of the vehicle and the lateral acceleration of the vehicle, calculate a target yaw rate based on the longitudinal speed of the vehicle and the lateral acceleration of the vehicle, calculate a target yaw moment based on the calculated target yaw rate, apply the target yaw moment to a torque vectoring motor of the vehicle, identify whether a lateral force of the vehicle and the target yaw moment meet a predetermined reference condition and control not to apply the target yaw moment to the torque vectoring motor of the vehicle, when the predetermined reference condition is not met.

\* \* \* \* \*